(12) United States Patent
Shimizu

(10) Patent No.: US 9,116,387 B2
(45) Date of Patent: Aug. 25, 2015

(54) LIGHTING DEVICE, DISPLAY DEVICE AND TELEVISION DEVICE

(75) Inventor: Takaharu Shimizu, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 276 days.

(21) Appl. No.: 13/817,669

(22) PCT Filed: Aug. 24, 2011

(86) PCT No.: PCT/JP2011/069028
§ 371 (c)(1),
(2), (4) Date: Feb. 19, 2013

(87) PCT Pub. No.: WO2012/029601
PCT Pub. Date: Mar. 8, 2012

(65) Prior Publication Data
US 2013/0148035 A1    Jun. 13, 2013

(30) Foreign Application Priority Data

Aug. 31, 2010   (JP) .................................. 2010-193803

(51) Int. Cl.
| G09F 13/04 | (2006.01) |
| G02F 1/1335 | (2006.01) |
| F21V 7/00 | (2006.01) |

(52) U.S. Cl.
CPC ............ *G02F 1/133605* (2013.01); *F21V 7/00* (2013.01); *G02F 1/133603* (2013.01)

(58) Field of Classification Search
CPC ...................... G02F 1/133603; G02F 1/133605
USPC ............................................... 362/97.1–97.4
See application file for complete search history.

(56) References Cited

U.S. PATENT DOCUMENTS

| 7,566,146 B2 * | 7/2009 | Jeon ............................... 362/247 |
| 2004/0062040 A1 * | 4/2004 | Blume et al. .................. 362/231 |
| 2005/0138852 A1 | 6/2005 | Yamauchi |

(Continued)

FOREIGN PATENT DOCUMENTS

| JP | 55-078585 U | 5/1980 |
| JP | 3-043208 U | 4/1991 |

(Continued)

OTHER PUBLICATIONS

International Search Report corresponding to PCT/JP2011/069028, dated Nov. 1, 2011.

*Primary Examiner* — Robert May
*Assistant Examiner* — Bryon T Gyllstrom
(74) *Attorney, Agent, or Firm* — Lowe Hauptman & Ham, LLP

(57) ABSTRACT

A backlight unit includes a chassis, a plurality of LED light sources, and a reflection member. The chassis includes a bottom plate and side plates, and has an opening on a front surface side. The LED light sources are arranged in a matrix on a front surface of the bottom plate of the chassis. The reflection member includes a plurality of through holes through which the respective LED light sources are passed and side wall portions having inclined surfaces on the sides thereof. The side wall portions provided in the end portion of the bottom plate of the chassis has a height greater than a height of the side wall portions provided in the middle portion of the bottom plate, and surround each of the LED light sources. The inclined surfaces lead light from the light sources toward the opening side of the chassis.

12 Claims, 8 Drawing Sheets

(56) References Cited

U.S. PATENT DOCUMENTS

| | | | |
|---|---|---|---|
| 2005/0219836 A1* | 10/2005 | Hung | 362/97 |
| 2005/0276066 A1* | 12/2005 | Kim et al. | 362/561 |
| 2006/0215075 A1* | 9/2006 | Huang et al. | 349/67 |
| 2006/0221612 A1* | 10/2006 | Song et al. | 362/247 |
| 2006/0245208 A1* | 11/2006 | Sakamoto et al. | 362/612 |
| 2007/0070625 A1* | 3/2007 | Bang | 362/240 |
| 2008/0037279 A1* | 2/2008 | Chan | 362/612 |
| 2008/0043463 A1* | 2/2008 | Park et al. | 362/231 |
| 2008/0219003 A1* | 9/2008 | Park | 362/247 |
| 2008/0297907 A1 | 12/2008 | Howe et al. | |
| 2009/0273735 A1* | 11/2009 | Yeh | 349/67 |
| 2010/0014021 A1* | 1/2010 | Sumida | 349/61 |

FOREIGN PATENT DOCUMENTS

| | | |
|---|---|---|
| JP | 2004-006317 A | 1/2004 |
| JP | 2008-159562 A | 7/2008 |
| JP | 2008-292991 A | 12/2008 |
| WO | 2008078428 A1 | 7/2008 |

\* cited by examiner

FIG.1
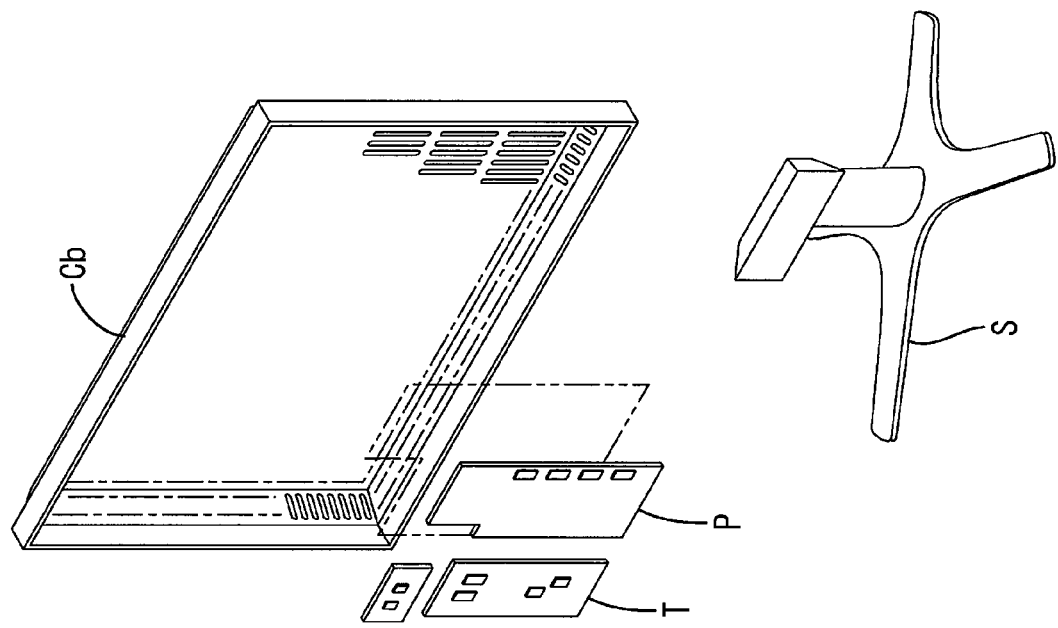
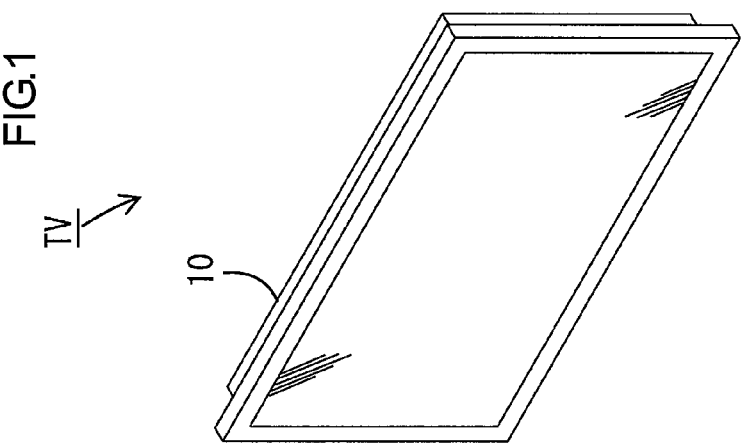
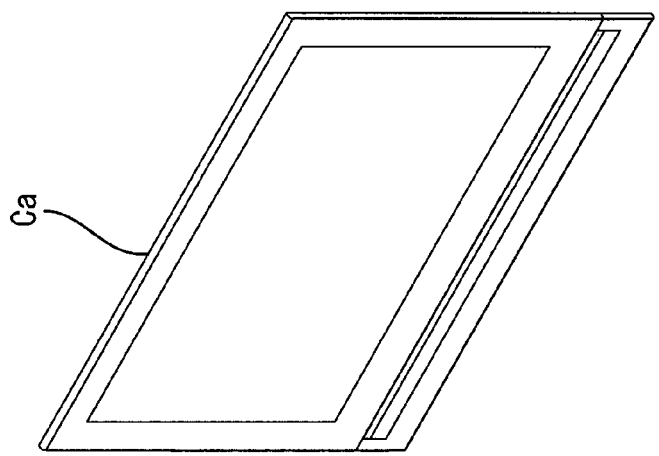

LIGHTING DEVICE, DISPLAY DEVICE AND TELEVISION DEVICE

RELATED APPLICATIONS

The present application is a National Phase of International Application Number PCT/JP2011/069028, filed Aug. 24, 2011, and claims priority from Japanese Application Number 2010-193803, filed Aug. 31, 2010.

TECHNICAL FIELD

The present invention relates to a lighting device, a display device, and a television device.

BACKGROUND ART

Displays in image display devices, such as television devices, are now being shifted from conventional cathode-ray tube displays to thin displays, such as liquid crystal displays and plasma displays. With the thin displays, the thicknesses of the image display devices can be decreased. Liquid crystal panels included in the liquid crystal display devices do not emit light, and thus backlight devices are required as separate lighting devices.

As the backlight unit, a direct type backlight unit that supplies light directly to a liquid crystal panel from the rear side of the liquid crystal panel is known. In such a backlight unit, a reflection member may be provided on a light source board on which light sources such as LEDs are arranged.

Patent Document 1 discloses a reflection member used in a direct type backlight unit, for example. The reflection member has a three-dimensional shape and includes inclined surfaces. The inclined surfaces incline from the mounting surface, on which the LEDs are mounted, toward the liquid crystal panel. The reflection member further includes a plurality of through holes and side wall portions. The through holes, through which a plurality of LEDs as light sources are individually passed, are evenly distributed in the reflection member. The side wall portions surround each of the LEDs, which are passed through the through holes, with a uniform area size. If such a reflection member is used for the direct type backlight unit including a plurality of LEDs arranged in a matrix, the inclined surfaces of the reflection member can evenly lead light that is emitted from the LEDs toward the liquid crystal panel side. Thus, brightness distribution can be nearly equalized in a display surface of the liquid crystal panel.

RELATED ART DOCUMENT

Patent Document

Patent Document 1: Japanese Unexamined Patent Application Publication No. 2008-292991

Problem to be Solved by the Invention

A backlight device for a large screen television is desired to increase the brightness in the center area of the display surface of the liquid crystal panel in view of a cost. However, the brightness distribution is nearly uniform over an entire area of the display surface in the direct type backlight device including the reflection member disclosed in Patent Document 1. Therefore, to increase the brightness in the center area of the display surface, the number of LEDs is required to be increased. This may result in increase in mounting cost of the LEDs and power consumption.

DISCLOSURE OF THE PRESENT INVENTION

This invention was made in view of the above circumstances. It is an object of this invention to provide a technology that can enhance brightness in a central portion of the display surface than a surrounding area in the direct type lighting device including light sources that are arranged in a matrix and the reflection member that is configured to lead light toward the display surface.

Means for Solving the Problem

A lighting device according to the present invention includes a chassis, a plurality of light sources, and a reflection member. The chassis includes a bottom plate and side plates. The bottom plate has peripheral end portions. The side plates rise from the peripheral end portions toward a first main surface side of the bottom plate. The chassis has an opening on the first main surface side. The plurality of light sources are arranged on the first main surface side of the bottom plate of the chassis in a matrix. The light sources are configured to emit light toward an opening side of the chassis. The reflection member has side wall portions and a plurality of through holes through which the respective light sources are passed. The side wall portions surround each of the light sources. The side wall portions provided close to peripheral end portion of the bottom plate have a height greater than a height of the side wall portions provided close to a middle portion of the bottom plate. Each of the side wall portions has an inclined surface on a side surface thereof. The inclined surface is inclined from a surface on which the light sources are mounted toward the opening side of the chassis. The inclined surface is configured to direct light from the light sources toward the opening side of the chassis.

The increase in height of the side wall portions enables to form the inclined surfaces to higher positions, leading more light toward the opening side of the chassis. In the above lighting device, the inclined surfaces of the side wall portions that are provided close to the middle portion of the bottom plate of the chassis extend to higher positions than the inclined surfaces provided in the peripheral end portion of the bottom plate. Therefore, more light reaches the inclined surfaces of the reflection member that are provided in the middle portion than the peripheral end portion. Accordingly, the amount of light led toward the opening side of the chassis can be relatively increased in the middle portion. This enhances the brightness in the middle portion of the display surface than the surrounding portion thereof.

The light sources may be arranged at regular intervals.

With this configuration, the light sources are arranged at regular intervals. This simplifies mounting work of the light sources to the chassis. Further, this enhances the brightness in the middle portion of the display surface than the surrounding portion thereof.

The side wall portions of the reflection member may surround each of the light sources with the uniform area size.

With this configuration, the side wall portions of the reflection member surround each of the plurality of light source with a uniform area size. Thus, the reflection member can be easily manufactured. Further, this enhances the brightness in the middle portion of the display surface compared to the surrounding portion thereof.

The side wall portions of the reflection member may form an edged tip end. The inclined surfaces of the side wall portions of the reflection member provided in the middle portion of the bottom plate of the chassis may be inclined with respect to a front direction of the light sources at an angle smaller than an angle at which the inclined surfaces of the side wall portions of the reflection member provided in the peripheral end portion inclined with respect to the front direction of the light sources.

With this configuration, the top ends of the side wall portions are edged, and the height of the side wall portions can be changed with keeping the uniform area size of the side wall portions surrounding each of the light sources. Because the top ends of the side wall portions are edged, the inclined surfaces of the side wall portions can be formed to higher positions than the side wall portions without having edged top ends. Consequently, more light emitted from the light sources reaches the inclined surfaces of the side wall portions. This enhances the brightness in the display surface of the liquid crystal panel.

The side wall portions of the reflection member may gradually increase in height as if closer to the middle portion from the peripheral end portion of the bottom plate of the chassis.

With this configuration, the amount of light reaching the inclined surfaces of the reflection member gradually increases from the side wall portions provided in the peripheral end portion of the bottom plate to the side wall portions provided in the middle portion of the bottom plate. Accordingly, the amount of light led toward the display surface gradually increases from the end portion to the middle portion of the bottom plate. Thus, adjustment can be made with high accuracy for achieving higher brightness in the middle portion of the display surface than the surrounding portion thereof.

The height of the side wall portions may increase at a regular ratio.

With this configuration, the brightness in the display surface changes from the end portion toward the middle portion at a regular ratio. The brightness of the backlight unit can be easily designed.

The lighting device may further include an optical member through which light from the light sources passes. The optical member is arranged on the opening side of the chassis such that a space is provided between the top ends of the side wall portions of the reflection member and the optical member.

With this configuration, the reflection member and the optical member are arranged having the space therebetween. Thus, the light led toward the opening side of the chassis can be effectively diffused by the optical member. This can enhance the brightness in the display surface.

Each of the light sources may have a light intensity distribution in which light having a peak light intensity travels in a direction inclined with respect to a front direction of the light source.

This increases a light distribution angle of the light emitted from the light sources. Thus, the amount of rays of light reaching the inclined surface among the rays of light emitted from the light sources increases. This can enhance the brightness in the display surface.

The inclined surfaces of the reflection member may be inclined with respect to the front direction of the light source at an angle smaller than an angle formed between the light having the peak light intensity and the front direction.

With this configuration, the light having the peak light intensity among the light emitted from the light sources reaches the inclined surface of the reflection member. This can increase the amount of the light led toward the front direction of the light sources among the light emitted from the light sources. Thus, the brightness in the display surface can be further enhanced.

The reflection member may be in a shape such that the side wall portions surround each of the light sources in a grid in a plan view. Thus, the reflection member can obtain high shape-stability.

The technology disclosed herein may be embodied as a display device including a display panel configured to display by using light provided by the above lighting device. Further, a display device including a liquid crystal panel using liquid crystals as the display panel has novelty and utility. Furthermore, a television device including the above display device has novelty and utility. The above display device and television can have an increased display area.

Advantageous Effect of the Invention

According to the technology disclosed herein, in the direct type lighting device including the reflection member leading light toward the display surface, uneven brightness is less likely to be caused in the display surface without increasing the number of light sources.

BRIEF DESCRIPTION OF THE DRAWINGS

FIG. 1 is an exploded perspective view of a general construction of a television device according to a first embodiment of the present invention.

MODE FOR CARRYING OUT THE INVENTION

First Embodiment

A first embodiment will be described with reference to the drawings. An X-axis, a Y-axis, and a Z-axis are illustrated in a part of each drawing. Directions indicated by the axes in each drawing correspond to directions indicated by the respective axes in other drawings. A Y-axis direction corresponds to a vertical direction and an X-axis direction corresponds to a horizontal direction.

FIG. 1 illustrates a television device TV according to the first embodiment in an exploded perspective view. As illustrated in FIG. 1, the television device TV includes a liquid crystal display 10, front and back cabinets Ca and Cb which house the liquid crystal display device 10 therebetween, a power supply P, a tuner T, and a stand S. The liquid crystal display device 10 has a landscape rectangular shape as a whole and held in the vertical position.

Figure 2:
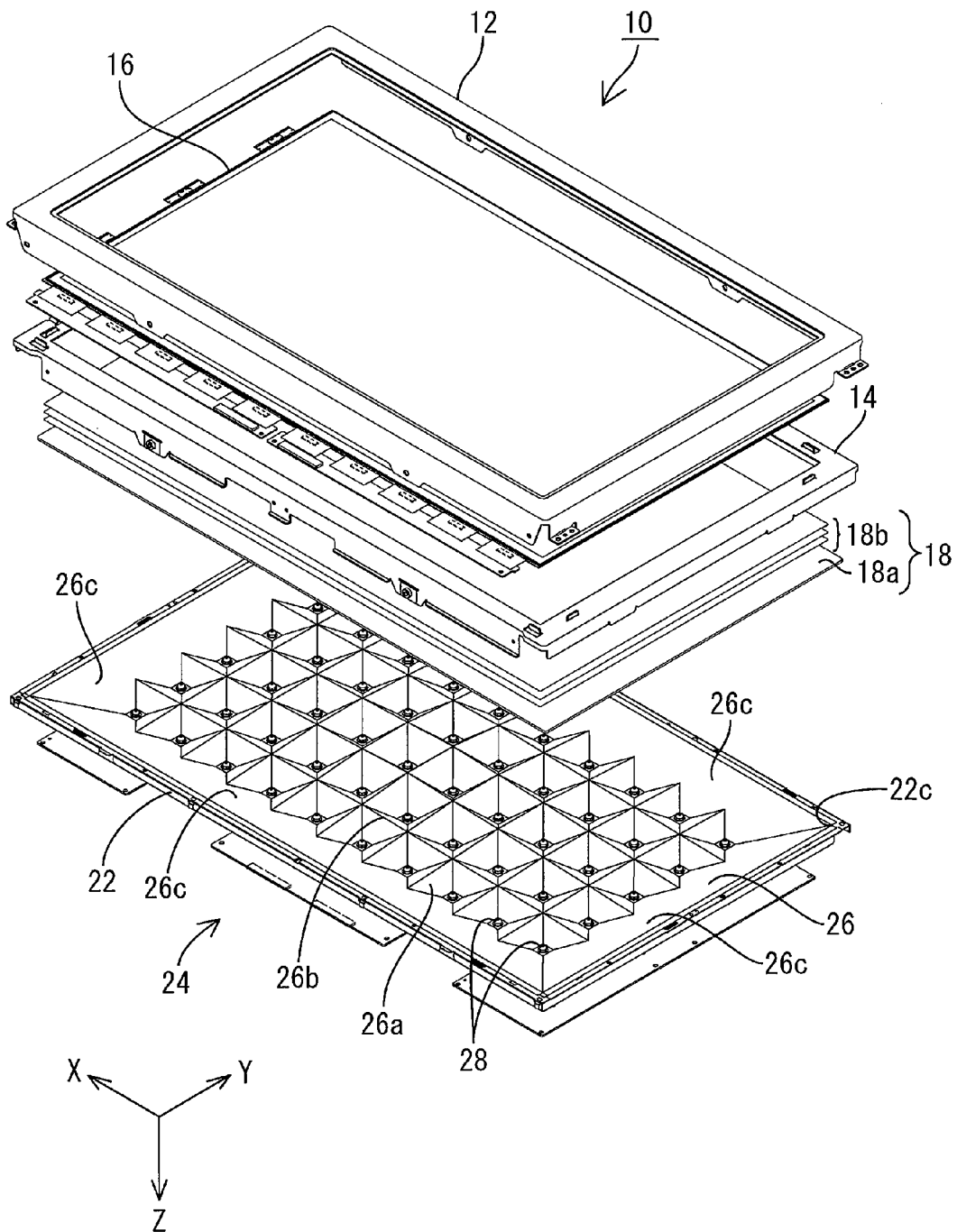
FIG. 2 is an exploded perspective view of a liquid crystal display device 10.

FIG. 2 illustrates the liquid crystal display device 10 in an exploded perspective view. An upper side in FIG. 2 corresponds to a front side, and a lower side therein corresponds to a rear side. As illustrated in FIG. 2, the liquid crystal display device 10 includes a liquid crystal panel 16 as a display panel, and a backlight unit 24 as an external light source. The liquid crystal panel 16 and the backlight unit 24 are integrally held by a frame-shaped bezel 12.

Next, the liquid crystal display panel 16 will be explained. The liquid crystal display panel 16 includes a pair of transparent glass substrates (highly capable of light transmission) and a liquid crystal layer (not illustrated). The glass substrates are bonded together with a predetermined gap therebetween. The liquid crystals are sealed between the glass substrates. On one of the glass substrates, switching components (for example, TFTs) connected to source lines and gate lines which are perpendicular to each other, pixel electrodes connected to the switching components, and an alignment film are provided. On the other glass substrate, color filters having color sections such as red (R), green (G), and blue (B) color sections arranged in a predetermined pattern, counter electrodes, and an alignment film are provided. Image data and control signals that are necessary for displaying an image are sent to the source lines, the gate lines, and the counter electrodes, from a drive circuit board, which is not illustrated. A polarizing plate (not illustrated) is arranged on an outer surface of each of the glass substrates.

Figure 3:
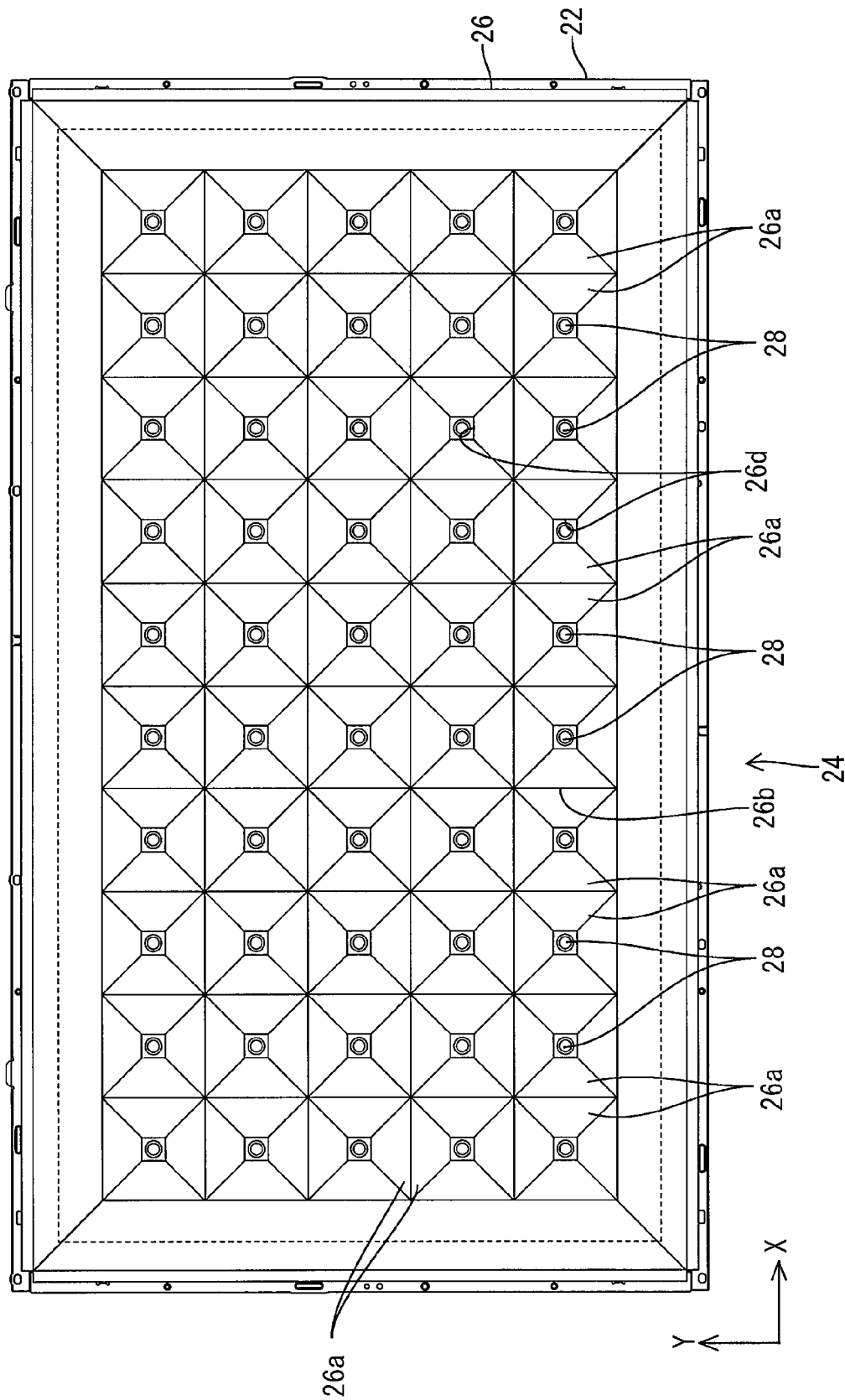
FIG. 3 is a plan view of a backlight unit 24.
Figure 4:
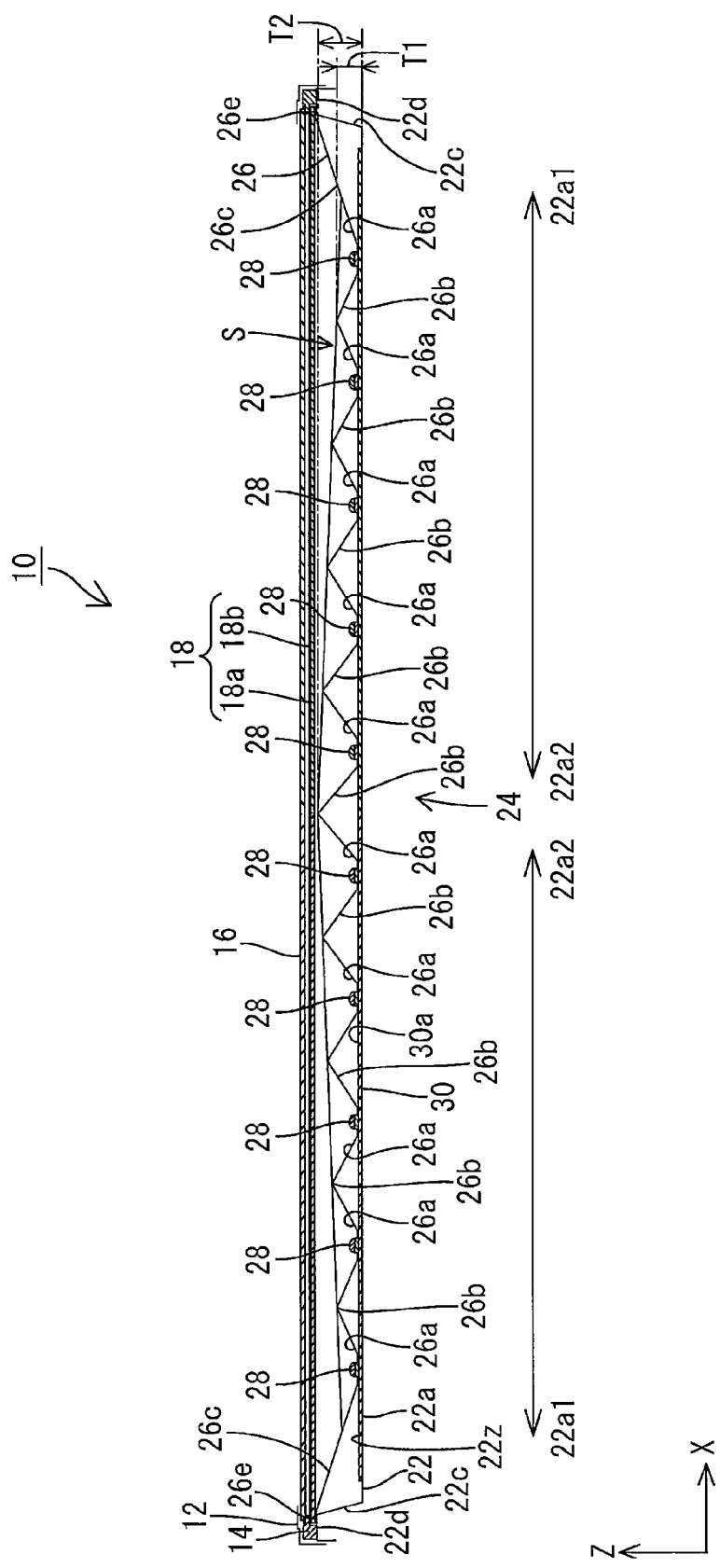
FIG. 4 is a cross-sectional view of the backlight unit 24.

Next, the backlight unit 24 will be explained. FIG. 3 illustrates the backlight unit 24 in a plan view. FIG. 4 illustrates the backlight unit 24 in a cross-sectional view along the horizontal direction (the x-axis direction). As illustrated in FIG. 2, the backlight unit 24 includes a chassis 22, an optical member 18, and a frame 14. The chassis 22 has a box-like shape having an opening on a front side (a light exit side, the liquid crystal panel 16 side). The optical member 18 is arranged on the front side of the chassis 22 so as to cover the opening thereof. The frame 14 has a frame-like shape and holds the liquid crystal panel 16 along inner peripheral edges of the frame 14.

The chassis 22 houses a plurality of point-like LED (Light Emitting Diode) light sources 28, an LED board 30 on which the LED light sources 28 are arranged (see FIG. 4), and a reflection member 26. As illustrated in FIG. 3, the LED light sources 28 are arranged in a matrix in a plan view. Namely, the LED light sources 28 are arranged along the horizontal direction and along the vertical direction. In the backlight unit 24, a light exit side is a side closer to the optical member 18 than the LED board 30. The backlight unit 24 directly supplies light to the liquid crystal panel 16 from a rear side of the liquid crystal panel 16 though the optical member 18.

The chassis 22 is made of metal such as an aluminum. The chassis 22 includes a bottom plate 22a, side plates 22c, and receiving plates 22d. The bottom plate 22a has a rectangular shape similar to the liquid crystal panel 16. The bottom plate 22a is arranged on the rear side of the LED board 30, i.e., on the side opposite to the light exit side of the LED light source 28. The side plates 22c rise from respective outer edges of the bottom plate 22a. The receiving plates 22d outwardly extend from rising edges of each of the side plates 22c. An overall shape of the chassis 22 is formed in a shallow box-like shape (shallow tray-like shape) opened to the front side. The frame 14 and the optical member 18 can be placed on the receiving plates 22d of the chassis 22 from the front side. The frame 14 is fixed to each receiving plate 22d with screws. Long sides of the chassis 22 match the X-axis direction (the horizontal direction) and short sides thereof match the Y-axis direction (the vertical direction).

Then, the LED board 30 and the LED light sources 28 arranged on the LED board 30 will be explained. As illustrated in FIG. 4, the LED board 30 has a landscape rectangular plate-like shape similar to the bottom plate 22a of the chassis 22. The LED board 30 is arranged on the front side of the bottom plate 22a of the chassis 22 such that long sides of the LED board 30 match the X-axis direction and short sides thereof match the Y-axis direction. The LED board 30 has a size that can cover substantially the entire area of a surface 22z of the bottom plate 22a, specifically, most middle area of the surface 22z of the bottom plate 22a other than an outer peripheral area of the surface 22z of the bottom plate 22a.

As illustrated in FIG. 3, the LED light sources 28 are mounted on a surface 30a of the LED board 30. As illustrated in FIG. 3, the LED light sources 28 are arranged planarly on the LED board 30 along the X-axis direction and the Y-axis direction. The LED light sources 28 are arranged along the X-axis direction and the Y-axis direction at regular intervals. The LED light sources 28 are mutually connected by a wiring pattern (not illustrated) on the LED board 30. A power circuit board (not illustrated) attached on the rear side of the bottom plate 22a of the chassis 22 supplies driving power to the LED light sources 28.

The LED light sources 28 are configured to emit white light. The LED light sources 28 each may be configured by mounting a red LED chip, a green LED chip, and a blue LED chip (not illustrated) on its surface. Alternatively, the LED light sources 28 each may include a blue light emitting diode covered with a phosphor having a light emitting peak in a yellow range to emit white light. Alternatively, the LED light sources 28 each may include a blue light emitting diode covered with phosphors having a light emitting peak in a green range and in a red range to emit white light. Alternatively, the LED light sources 28 each may include a blue light emitting diode covered with a phosphor having a light emitting peak in a green range and a red light emitting diode. Alternatively, the LED light sources 28 each may include a blue light emitting diode, a green light emitting diode, and a red light emitting diode to emit white light. Alternatively, the LED light sources 28 each may include an ultraviolet light emitting diode and phosphors. Particularly, the LED light sources 28 may include an ultraviolet light emitting diode covered with phosphors each having a light emitting peak in a blue range, a green range, and a red range to emit white light.

Figure 5:
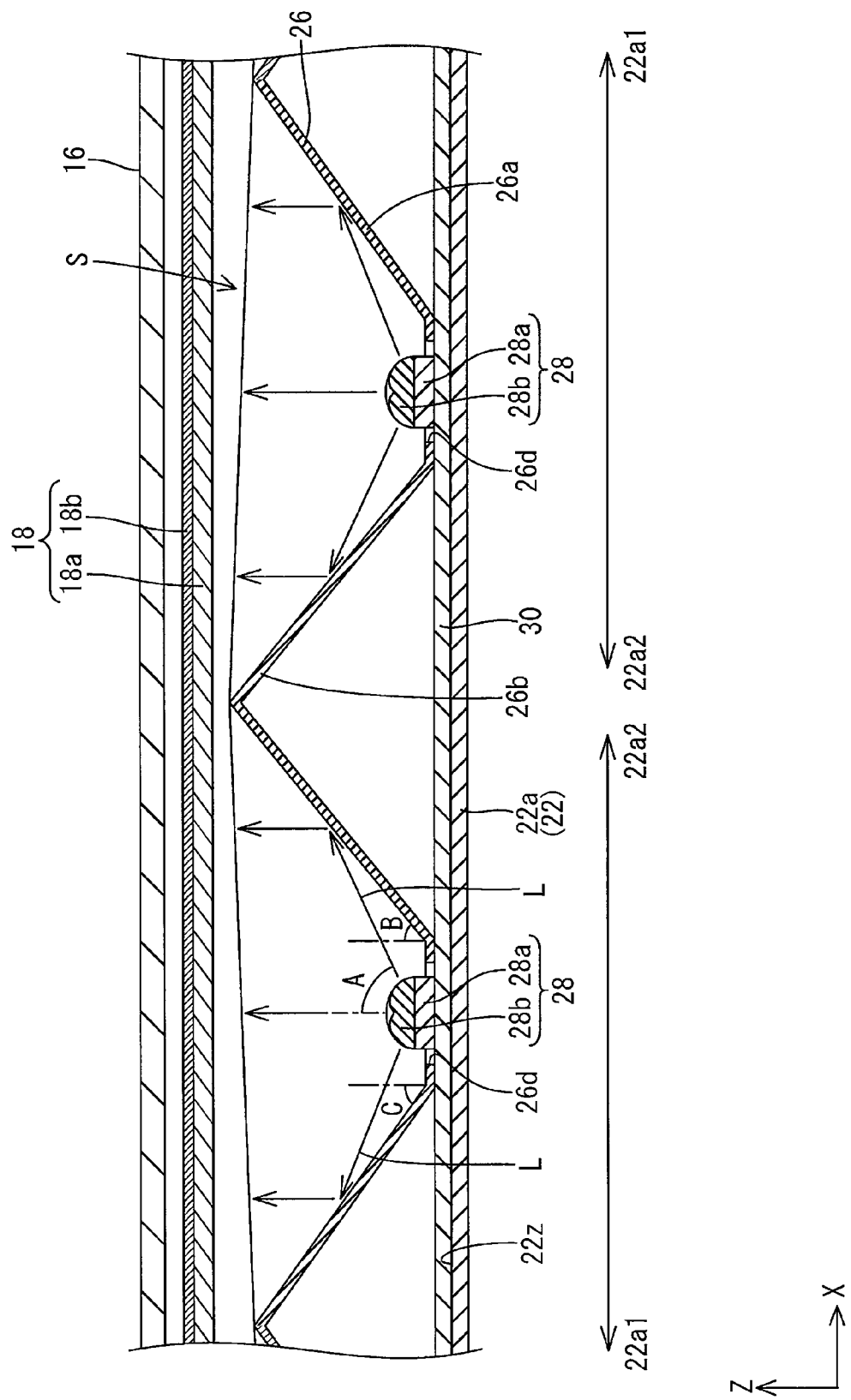
FIG. 5 is a magnified cross-sectional view of the backlight unit 24.
Figure 6:
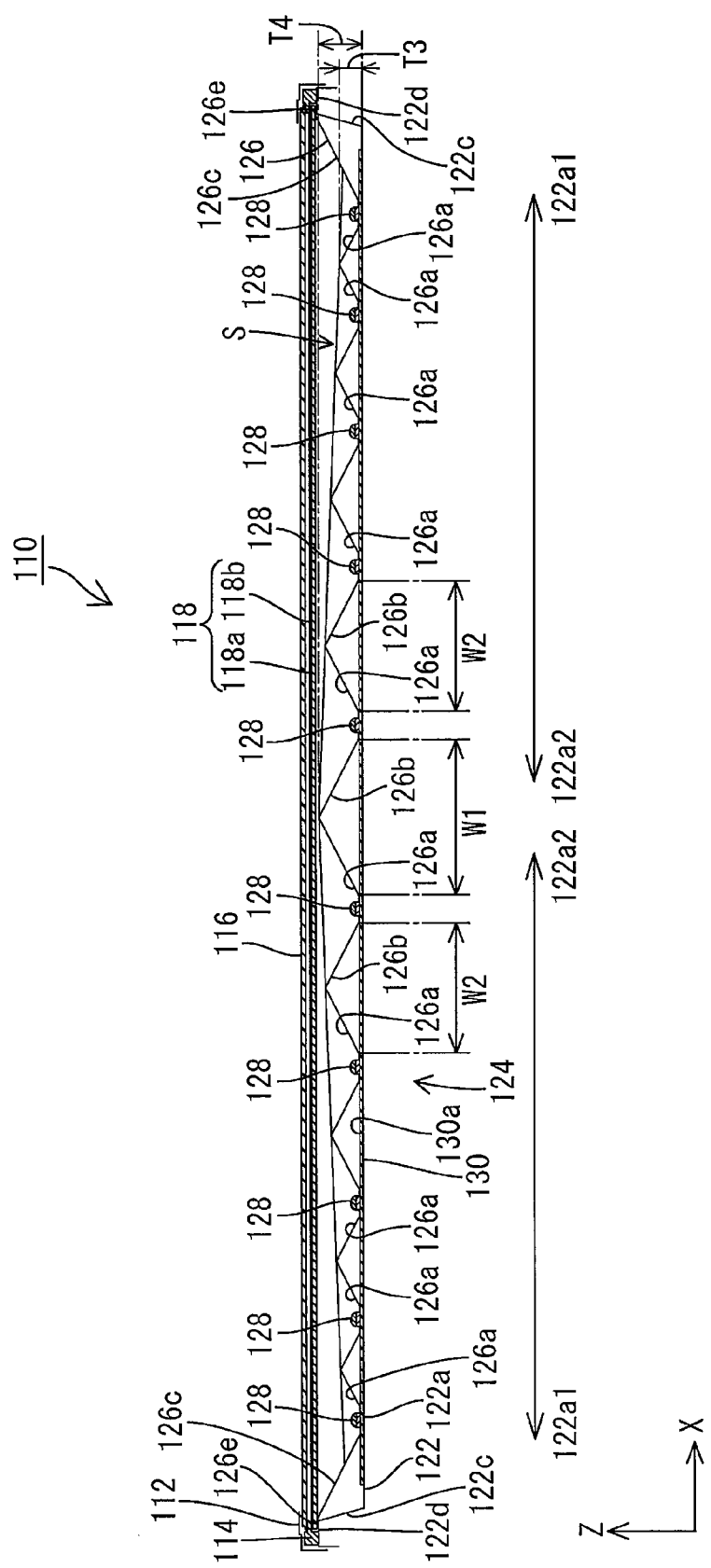
FIG. 6 is a cross-sectional view of a backlight unit 124 according to a second embodiment.

Next, a light intensity distribution of the LED light sources 28 will be described in detail. FIG. 5 is a cross-sectional view illustrating the backlight unit 24. FIG. 5 is a cross-sectional view illustrating a part of FIG. 4 and is a magnified view of an area around a central portion 22a2 of the bottom plate 22a of the chassis 22. The reference character L indicates a traveling direction of rays of light having a peak light intensity among rays of light emitted from the light source 28. As illustrated in FIG. 6, each LED light source 28 is arranged on a surface of the LED board 30. The LED light source 28 includes a base portion 28a and a light output surface 28b covering the base portion 28a. The light is emitted from the base portion 28a. The light output surface 28b is transparent and has a hemispherical shape. Each of the LED light sources 28 has a light distribution in which light having the peak light intensity travels in a direction inclined with respect to a front direction of the LED light source 28. Herein, a specific unit of the light intensity includes a radiant intensity (W/sr·m2), a radiant flux (W), and irradiance (W/m2). Any other physical quantities relating to quantity of radiation may be used as the specific unit of the light intensity.

The light having the peak light intensity is radiated from a center of the LED 17 and travels in a direction L inclined at a predetermined angle A with respect to the front direction of the LED light source 28. Accordingly, the LED light source 28 diffuses light over a wide range. The reflection member 26 has inclined surfaces 26a. Each inclined surface 26a inclines at a predetermined angles B and C with respect to the front direction of the LED light source 28. The angle A is greater than the angle B and C in the backlight unit 24 (the angle A> the angle B). The above relationship is not necessarily applied to only the inclined surfaces 26a described in FIG. 5. The above relationship is applied to all of the inclined surface 26a arranged in the backlight unit 24. Therefore, the rays of light having the peak light intensity among the rays of light emitted from the LED light source 28 reach the inclined surfaces 26a. Thus, most of the rays of light emitted from the LED light sources 28 are directed in the front direction of the LED light source 28. Further, the inclined surface 26a that extend to a higher position can direct more rays of light toward the optical member 18 (the front direction of the LED light source 28).

Next, the reflection member 26 will be explained. The reflection member 26 is made of a thermoplastic synthetic resin. A front surface of the reflection member 26 has a white color that provides high light reflectivity. The reflection member 26 is arranged on the front side of the LED board 30 that is arranged on the front surface of the chassis 22. The reflection member 26 has a size that can cover substantially the entire area of the LED board 30. As illustrated in FIGS. 2 and 3, the reflection member 26 extends along the LED board 30 and includes side wall portions 26b, four rising portions 26c, and four extended portions 26e.

Each side wall portion 26b rises toward the front side (the side on which the chassis 22 opens). The side wall portions 26b are arranged in a matrix in a plan view such that the side wall portions 26b surround each of the LED light sources 28 arranged in a matrix. The side wall portions 26b that are arranged close to an end portion 22a1 of the bottom plate 22a of the chassis 22 (hereinafter, referred to as side wall portions 26b in the end portion 22a1) have a height T1. The side wall portions 26b that are arranged close to a middle portion 22a2 of the bottom plate 22a (hereinafter, referred to as side wall portions 26b in the middle portion 22a2) have a height T2. The height T2 is greater than the height T1 (see FIG. 2 and FIG. 4). The height of the side wall portions 26b increases at a regular ratio from the side wall portions 26b in the end portion 22a1 toward the side wall portions 26b in the middle portion 22a2. The description that increases at a regular ratio herein denotes that the height of the side wall portions 26b increases in geometric progression, for example. Each of the side wall portions 26b has a regular width. Further, each of the side wall portions 26b has an edged tip end.

Each rising portion 26c rises from an outer peripheral edge of the bottom portion 26f. The rising portion 26c is inclined with respect to the bottom plate 22a of the chassis 22. Each extended portion 26e extends outwardly from an outer edge of each rising portion 26c. The extended portion 26e is placed on the respective receiving plate 22d of the chassis 22. Further, light source through holes 26d are formed in the bottom portion of the reflection member 26 so as to correspond to the LED light sources 28 in a plan view, respectively. Each of the LED light sources 28 passes through each of the light source through holes 26d. The light source through holes 26d are formed along the X-axis direction and the Y-axis direction so as to correspond to the positions of the LED light sources 28. Each LED light source 28 that is passed through each light through hole 26d and exposed to the front side, is surrounded by the side wall portions 26b.

Side surfaces of the side wall portion 26b are that inclined surfaces 26a. The inclined surfaces 26a incline from the LED board 30 toward the front side (the opening side of the chassis 22). Most of the parts of the reflection member 26 except for edge portions of the light source through holes 26d project toward the front side to form the inclined surfaces 26a. The remaining part of the reflection member 26 that is a bottom portion is supported by the LED board 30. The four inclined surfaces 26a are provided to form an inverted and truncated square pyramid shape so as to surround each of the LED light sources 28. The inclined surfaces 26a form square shapes as a whole in a plan view. The reflection member 26a formed in the above shape is excellent in shape-stability compared to a reflection member having inclined surfaces formed in an inverted conical shape so as to surround each LED light source 28. Further, the light that is emitted from each LED light source 28 and reaches each inclined surface 26a can be directed toward the front side (the opening side of the chassis). The side wall portions 26b in the middle portion 22a2 have a height greater than the side wall portions 26b in the end portion 22a1 side as described above. Namely, the inclined surfaces 26a of the side wall portions 26b in the middle portion 22a2 are formed to a higher position than the inclined surfaces 26a of the side wall portions 26b in the end portion 22a1.

Further, an angle between each inclined surface 26a and the front direction of each light source 28 gradually decreases from the side wall portions 26b in the end portion 22a1 toward the side wall portions 26b in the middle portion 22a2. As illustrated in FIG. 5, the inclined surface 26a of the side wall portion 26b in the middle portion 22a2 is inclined at an angle B with respect to the front direction of the light source 28. The inclined surface 26a of the side wall portion 26b arranged closer to the end portion 22a1 is inclined at an angle C with respect to the front direction of the LED light source 28. The angle B is smaller than the angle C. In other words, an angle formed between each inclined surface 26a and the LED board 30 gradually increases as is closer to the side wall portions 26b arranged in the middle portion 22a2 of the bottom plate 22a from the side wall portions 26b arranged in the end portion 22a1. The side wall portions 26b project toward the optical member 18 having a predetermined space S between the projected ends and the optical member 18. The side wall portions 26b are not in contact with the optical member 18. The space S enables the light emitted from adjacent the LED light sources 28, which are surrounded by the inclined surfaces 26a, to travel each other.

The optical member 18 arranged on the opening side of the chassis 22 will be explained. The optical member 18 is placed on the receiving plate 22d of the chassis with the extended portion 26e of the reflection member 26 therebetween. The optical member 18 is arranged parallel to the LED board 30 and covers the opening of the chassis 22. The diffuser plate 18a of the optical members 18 includes a synthetic resin plate with light scattering particles dispersed therein. The diffuser plate 18a has a function of diffusing point light emitted by the LED light sources 28, which are dot-like light sources. The diffuser plate 18a also has a light reflection function of reflecting light emitted by the LED light sources 28. The optical sheets 18b include a diffuser sheet, a lens sheet, and a reflection-type polarizing plate layered in this sequence from the diffuser plate 18a side on the front side of the diffuser plate 18a. The optical sheets 18b have a function of converting light emitted by the LED light sources 28 and passed through the diffuser plate 18a into planer light. The liquid crystal panel 16 is arranged at the front of the optical sheets 18b. The optical sheets 18b are sandwiched between the diffuser plate 18a and the liquid crystal panel 16.

The operation of the backlight unit 24 in this embodiment will be described. If each of the LED light sources 28 arranged in the backlight unit 24 is lit, the light widely emitted from each LED light source 28 directly enters the optical member 18, or indirectly enters the optical member 18 after being reflected by the inclined surfaces 26a of the reflection member 26. The light receives an optical effect from the optical member 18 and exits from the front-surface side of the optical member 18 toward the liquid crystal panel 16. Herein, the inclined surfaces 26a of the side wall portions 26b in the middle portion 22a2 extend to higher positions than the inclined surfaces 26a of the side wall portions 26b in the end portion 22a1. Therefore, the inclined surfaces 26a of the side wall portions 26b in the middle portion 22a2 receive more light than the inclined surfaces 26a of the side wall portions 26b in the end portion 22a1. Consequently, more light is directed to a middle portion of the optical member 18 and led to the liquid crystal panel 16. Thus, the middle portion of a display surface of the liquid crystal panel 16 has brightness higher than the surrounding portion thereof.

In the backlight unit 24 according to the above embodiment, the inclined surfaces 26a of the side wall portions 26b that are arranged in the middle portion 22a2 of the bottom plate 22a of the chassis 22 extend to higher positions than the inclined surfaces 26a of the side wall portions 26b arranged in the end portion 22a1 of the bottom plate 22a. Accordingly, the amount of light reaching the inclined surfaces 26a of the side wall portions 22b in the middle portion 22a2 increases, compared to the amount of light reaching the inclined surfaces 26a of the side wall portions 22b in the end portion 22a1. Thus, the amount of light directed in the opening side of the chassis 22 increases in the middle portion 22a2. This enhances the brightness in the middle portion of the display surface of the liquid crystal panel 16 compared to the surrounding portion thereof.

In the backlight unit 24 according to the above embodiment, the brightness in the middle portion of the display surface of the liquid crystal panel 16 can be increased 1.1 times higher than the conventional backlight unit that includes a reflection member for leading light toward the opening side of the chassis and light sources that are arranged in a matrix. Consequently, a television having a large display with high brightness can be achieved at a low cost compared to the conventional ones.

In the backlight unit 24 according to the above embodiment, the LED light sources 28 are arranged at regular intervals. This simplifies mounting work of the LED light sources 28 to the chassis 22. Further, this enhances the brightness in the middle portion of the display surface of the liquid crystal panel 16 than the surrounding portion thereof.

In the backlight unit 24 according to the above embodiment, the side wall portions 26b of the reflection member 26 surround each of the LED light sources 28 in a uniform area size. This enhances the brightness in the middle portion of the display surface of the liquid crystal panel 16 than the surrounding portion thereof.

In the backlight unit 24 according to the above embodiment, the side wall portions 26b of the reflection member 26 form an edged tip end. The inclined surfaces 26a of the side wall portions 26b in the middle portion 22a2 are inclined with respect to the front direction of the LED light sources 28 at an angle that is smaller than an angle at which the inclined surfaces 26a of the side wall portions 22b in the end portion 22a1 are inclined with respect to the front direction of the respective LED light sources 28. With this configuration, even if the side wall portions 26b have the edged tip end, the height of the side wall portions 26b can be changed with maintaining the uniform area size of the wall portions 26b surrounding each of the LED light sources 28. Because the tip end of the side wall portions 26b are edged, the inclined surfaces 26a of the side wall portions 26b can extend to higher positions than the inclined surfaces 26a of the side wall portions 26b without having the edged tip ends. Consequently, a greater amount of light emitted from the LED light sources 28 reaches the inclined surfaces 26a of the side wall portions 26b. This enhances the brightness in the display surface of the liquid crystal panel 16.

In the backlight unit 24 according to the above embodiment, the height of the side wall portions 26b of the reflection member 26 gradually increase from the side wall portions 26b in the end portion 22a1 toward the side wall portions 26b in the middle portion 22a2. With this configuration, the amount of light reaching the inclined surfaces 26a of the side wall portions 26b gradually increases from the side wall portions 26b arranged in the end portion 22a1 to the side wall portions arranged in the middle portion 22a1. Accordingly, the amount of light led toward the display surface of liquid crystal panel 16 gradually increases from the side wall portions 26b in the end portion 22a1 toward the side wall portions 26b in the middle portion 22a1. Thus, the brightness is adjusted with high accuracy for achieving higher brightness in the middle portion of the display surface than the surrounding portion thereof.

In the backlight unit 24 according to the above embodiment, the height of the side wall portions 26b increases gradually at a regular ratio. With this configuration, the brightness in the display surface of the liquid crystal panel 16 changes in a gradual manner from the end portion toward the middle portion at a regular ratio. Accordingly, the brightness of the backlight unit 24 is easily designed.

The backlight unit 24 according to the above embodiment includes the optical member 18 through which light from the LED light sources passes. The optical member 18 is arranged on the opening side of the chassis 22 such that the space S is provided between the optical member 18 and the top ends of the side wall portions 26b of the reflection member 26. With this configuration, the light led toward the opening side of the chassis 22 can be effectively diffused by the optical member 18. This can enhance the brightness in the display surface of the liquid crystal panel 16.

In the backlight unit 24 according to the above embodiment, each of the LED light sources 28 has a light intensity distribution in which light having a peak light intensity travels in a direction inclined with respect to the front direction of the LED light source 28. This increases a light distribution angle of the light emitted from the LED light sources 28. Thus, the amount of light reaching the inclined surfaces 26b among the light emitted from the LED light sources 28 increases. This can enhance the brightness in the display surface of the liquid crystal panel 16.

In the backlight unit 24 according to the above embodiment, each inclined surface 26a of the reflection member 26 is inclined with respect to the front direction of the LED light source 28 at an angle smaller than an angle formed between the light having the peak light intensity and the front direction. With this configuration, the rays of light having the peak light intensity among the rays of light emitted from the LED light sources 28 reaches the inclined surfaces 26a of the reflection member 26. This can increase the amount of rays of light directed in the front direction of the LED light sources 28 among the rays of light directed in the LED light sources 28. Thus, the brightness in the display surface of the liquid crystal panel 16 can be further enhanced.

In the backlight unit 24 according to the above embodiment, the side wall portions 26a of the reflection member 26 are formed in a grid to surround each of the LED light sources 28 individually with a plan view. Thus, the reflection member 26 is excellent in the shape-stability.

Second Embodiment

A second embodiment will be explained with reference to the drawings. FIG. 6 illustrates a backlight unit 124 according to the second embodiment in a cross-sectional view taken along the horizontal direction (the X-axis direction). The second embodiment differs from the first embodiment in the width of the side wall portion of the reflection member and the inclination angle of the inclined surfaces of the side wall portions. Other structures are same as those of the first embodiment, and thus configurations, functions, and effects similar to those of the first embodiment will not be explained. In FIG. 6, members and portions indicated by the number obtained by adding 100 to the reference numerals in FIG. 4 are the same as the members and the portions explained in the first embodiment.

In the backlight unit 124 according to the second embodiment, side wall portions 126b of a reflection member 126 vary in width. Specifically, the side wall portions 126b in a middle portion 122a2 have a width greater than side wall portions 126b in the end portion 122a1. The side wall portions 26b arranged closest to the middle portion 122a2 have a width W1. The side wall portions 26b arranged closer to the end portion 122a1 have a width W2. The width W1 is greater than the width W2. Each inclined surface 126a of the side wall portions 126b is inclined at a uniform angle with respect to a front direction of the LED light sources 128. Namely, each of the inclined surfaces 126b is inclined with respect to an LED board 130 at a uniform angle. In the backlight unit 124, each of the side wall portions 126b of the reflection member 126 changes in its width and has a uniform inclination angle. With such a configuration, the side wall portions 126b in the middle portion 122a2 (height T4) are greater in height than the side wall portions 126b in the end portion 122a1 (height T3). This enhances the brightness in middle portion of the display surface of the liquid crystal panel 116 compared to the surrounding portions thereof.

Third Embodiment

Figure 7:
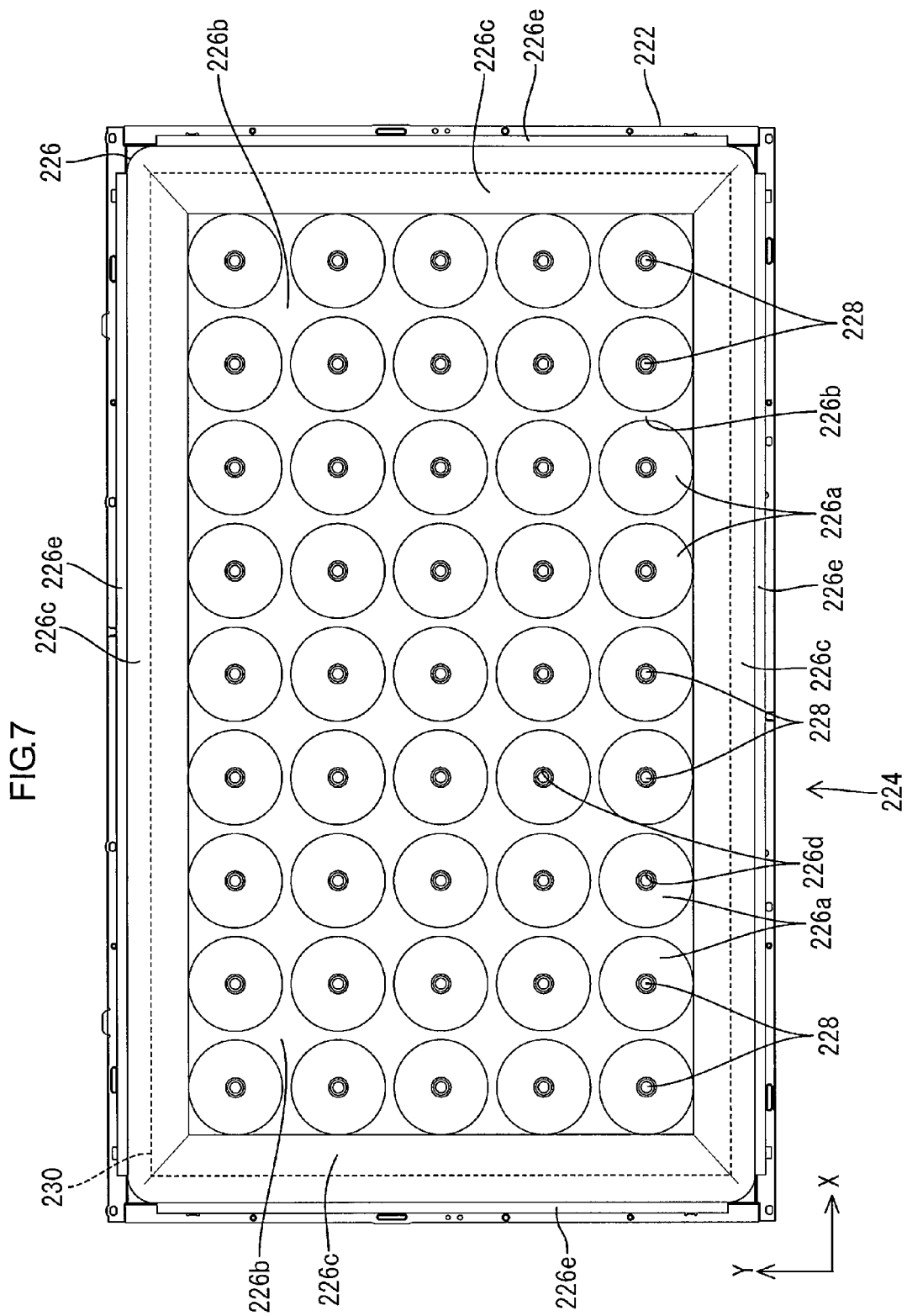
FIG. 7 is a plan view of a backlight unit 224 according to a third embodiment.
Figure 8:
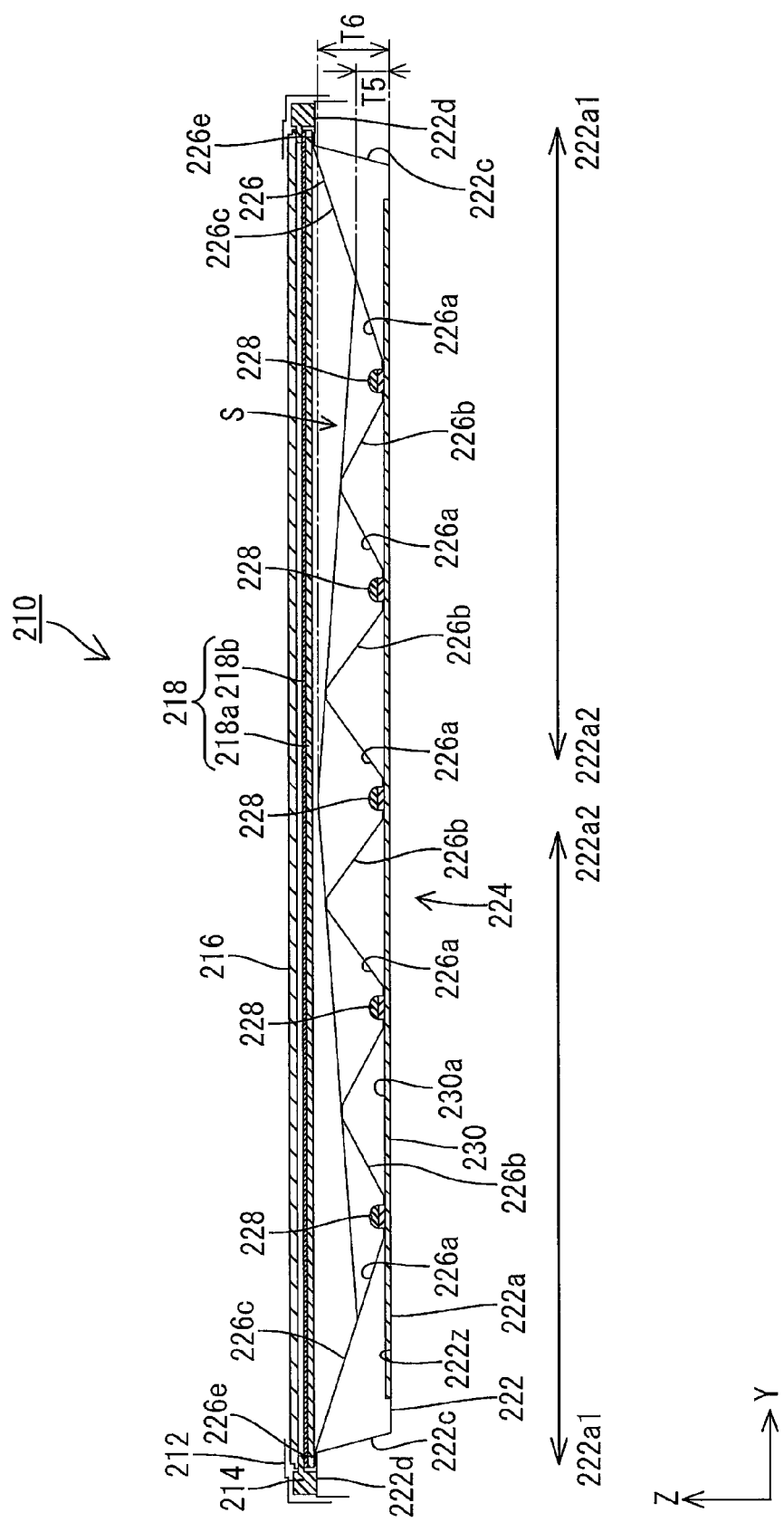
FIG. 8 is a cross-sectional view of the backlight unit 224.

A third embodiment will be explained with reference to the drawings. FIG. 7 illustrates a backlight unit 224 according to the third embodiment in a plan view. FIG. 8 illustrates the backlight unit 224 in a cross-sectional view taken along the vertical direction (the Y-axis direction). The third embodiment differs from the first embodiment in the shape of a reflection member. The other structures are same as those of the first embodiment, and thus configurations, functions, and effects similar to those of the first embodiment will not be explained. In FIG. 7, members and portions indicated by the number obtained by adding 200 to the reference numerals in FIG. 3 are the same as the members and the portions explained in the first embodiment.

In a backlight unit 224 according to the third embodiment, each of the inclined surfaces 226a of a reflection member 226 has a curved surface extending in a circumferential direction to form a conical shape. Projected ends of the side wall portions 226b are connected by a flat surface. The side wall portions 226b in the middle portion 222a2 have a height T6. The side wall portions 226b in the end portion 222a1 have a height T5. The height T6 is greater than the height T5. Even if the backlight unit 224 includes the reflection member 226 having the shape described above, the height T6 of the side wall portions 226b in the middle portion 222a2 can be greater than the height T5 of the side wall portions 226b in the end portion 222a1. Thus, the middle portion of a display surface of the liquid crystal panel 216 has brightness higher than the surrounding portion thereof.

The configuration of the embodiments correspond to the configuration of the present invention as follows: the surface 22z, 122z, 222z of the bottom plate 22a, 122a, 22a is one example of "a first main surface"; the LED light source 28, 128, 228 is one example of "a light source"; light source through hole 26d, 126d, 226d is one example of "a through hole"; the surface 30a, 130a, 230a of the LED board 30, 130, 230 is one example of "a mounting surface"; the backlight unit 24, 124, 224 is one example of "a lighting unit", and the space S is one example of "a space".

The above embodiments may include the following modifications.

(1) In the above embodiments, the height of the side wall portions increases from the end portion to the middle portion at a regular ratio. However, the height of the side wall portions does not necessarily increase at the regular ratio in a gradual manner as long as the side wall portions in the middle portion have height greater than the side wall portions in the end portion.

(2) In the above embodiments, the LED light sources may be arranged at regular intervals. However, the LED light sources may not be arranged at regular intervals. In such a case, the angles of the inclined surfaces of the reflection member may be adjusted according to the intervals of the LED light sources. With this configuration, the number of the LED light sources can be decreased. This lowers the mounting cost of the LED light sources.

(3) In the above embodiments, the LED light sources are arranged in rows and columns corresponding to the X-axis direction (along the long direction of the chassis) and the Y-axis direction (along the short direction of the chassis). However, the LED light sources may not be arranged in rows and columns corresponding to the X-axis direction and the Y-axis direction.

(4) The shape of the reflection member is not limited to the above embodiments, and may be suitably changed.

(5) In the above embodiments, the liquid crystal display device including the liquid crystal panel as a display panel is used. The technology can be applied to display devices including other types of display panels.

(6) In the above embodiments, the television device including the tuner is used. However, the technology can be applied to a display device without a tuner.

The embodiments of the present invention are explained in detail above for illustrative propose only, and it is to be understood that the claims are not limited by the forgoing description. The technology described in the claims includes the various modifications of the embodiments described above.

The technology components described in the description and the drawings are not required to be used in the combination described in the claims as originally filed. The technology components can show its technical utility when used either alone or in combination. In addition, the technology described in the above description and the drawings can achieve more than one object at the same time, and the technical utility of the technology can be recognized when the technology achieves one of the objects.

EXPLANATION OF SYMBOLS

TV: television device, Ca, Cb: cabinet, T: tuner, S: stand, 10, 110, 210: liquid crystal display device, 12, 112, 212: bezel, 14, 114, 214: frame, 16, 116, 216: liquid crystal panel, 18, 118, 218: optical member, 22, 122, 222: chassis, 24, 124, 224: backlight unit, 26, 126, 226: reflection member, 26a, 126a, 226a: inclined portion, 26b, 126b, 226b: side wall portion, 28, 128, 228: LED light source, 30, 130, 230: LED board.

The invention claimed is:

1. A lighting device, comprising:
a chassis including a bottom plate and side plates, the bottom plate having peripheral end portions, the side plates rising from the peripheral end portions toward a first main surface side of the bottom plate, the chassis having an opening on the first main surface side;
a plurality of light sources arranged on the first main surface side of the bottom plate of the chassis in a matrix, each of the light sources configured to emit light toward an opening side of the chassis; and
a reflection member having side wall portions and a plurality of through holes through which the respective light sources are passable, the side wall portions surrounding each of the light sources,
  each of the side wall portions having an inclined surface on a side surface thereof, the inclined surface being inclined from a surface on which the light sources are mounted toward the opening side of the chassis, and the inclined surface configured to direct light from the light sources toward the opening side of the chassis, and
  the side wall portions provided close to the peripheral end portion of the bottom plate having a height greater than a height of the side wall portions arranged close to a middle portion of the bottom plate,
wherein the side wall portions of the reflection member gradually increase in height as if closer to the middle portion from the peripheral end portion of the bottom plate of the chassis.

2. The lighting device according to claim 1, wherein the light sources are arranged at regular intervals.

3. The lighting device according to claim 1, wherein the side wall portions surround each of the light sources with a uniform area size.

4. The lighting device according to claim 1, wherein
each of the side wall portions of the reflection member has an edged tip end, and
each inclined surface of the side wall portions of the reflection member provided in the middle portion of the bottom plate of the chassis is inclined with respect to a front direction of the light sources at an angle that is smaller than an angle at which the inclined surface of the side wall portions of the reflection member provided in the peripheral end portion inclined with respect to the front direction of the light sources.

5. The lighting device according to claim 1, wherein the height of the side wall portions increases at a regular ratio.

6. The lighting device according to claim 1, further comprising an optical member through which the light from the light sources is passable and arranged on the opening side of the chassis such that a space is provided between the optical member and top ends of the side wall portions of the reflection member.

7. The lighting device according to claim 1, wherein each of the light sources has a light intensity distribution in which light having a peak light intensity travels in a direction inclined with respect to a front direction.

8. The lighting device according to claim 7, wherein the inclined surfaces of the reflection member are inclined with respect to the front direction of the light sources at an angle smaller than an angle formed between the light having the peak light intensity and the front direction.

9. The lighting device according to claim 1, wherein the side wall portions of the reflection member surround each of the light sources individually in a grid in a plan view.

10. A display device, comprising:
a display panel configured to provide display using light from the lighting device according to claim 1.

11. The display device according to claim 10, wherein the display panel is a liquid crystal panel using liquid crystals.

12. A television device comprising the display device according to claim 10.

* * * * *